US010423908B2

(12) United States Patent
Inamori

(10) Patent No.: US 10,423,908 B2
(45) Date of Patent: Sep. 24, 2019

(54) OPERATION MANAGEMENT APPARATUS, OPERATION MANAGEMENT METHOD, AND COMPUTER-READABLE STORAGE MEDIUM

(71) Applicant: CASIO COMPUTER CO., LTD., Tokyo (JP)

(72) Inventor: Jun Inamori, Tachikawa (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 156 days.

(21) Appl. No.: 15/223,871

(22) Filed: Jul. 29, 2016

(65) Prior Publication Data

US 2017/0091695 A1 Mar. 30, 2017

(30) Foreign Application Priority Data

Sep. 25, 2015 (JP) .................................. 2015-187598

(51) Int. Cl.
  *G06Q 10/06* (2012.01)
  *G06F 16/248* (2019.01)
  *G06F 16/9535* (2019.01)
(52) U.S. Cl.
  CPC ... *G06Q 10/063114* (2013.01); *G06F 16/248* (2019.01); *G06F 16/9535* (2019.01); *G06Q 10/06315* (2013.01); *G06Q 10/063118* (2013.01)
(58) Field of Classification Search
  CPC ......... G06Q 10/00; G06Q 40/00; G06F 17/60
  USPC ...................................................... 705/7.15
  See application file for complete search history.

(56) References Cited

U.S. PATENT DOCUMENTS

| 7,587,339 B2* | 9/2009 | Kataoka | G06Q 30/06 705/26.8 |
| 2004/0107191 A1* | 6/2004 | Osaka | G01S 5/0072 |
| 2004/0267592 A1* | 12/2004 | Ogushi | G06Q 10/06 705/7.42 |
| 2008/0133262 A1* | 6/2008 | Nishikawa | G06Q 10/06 705/7.13 |

(Continued)

FOREIGN PATENT DOCUMENTS

| CN | 1776756 A | 5/2006 |
| CN | 101452618 A | 6/2009 |

(Continued)

OTHER PUBLICATIONS

Japanese Office Action dated Nov. 28, 2017, issued in corresponding Japanese Patent Application No. 2015-187598. (8 pages).

(Continued)

*Primary Examiner* — Romain Jeanty
(74) *Attorney, Agent, or Firm* — Fitch, Even, Tabin & Flannery LLP

(57) ABSTRACT

An operation management apparatus includes the following. A storage unit stores operation instruction information showing contents of an operation instruction associated with a person in charge. According to a request from a register terminal, a searching unit searches the storage unit for operation instruction information corresponding to the person in charge who is assigned to the register terminal. A transmitting unit transmits the operation instruction information searched by the searching unit to the register terminal.

12 Claims, 8 Drawing Sheets

(56) References Cited

U.S. PATENT DOCUMENTS

| | | | | |
|---|---|---|---|---|
| 2013/0085796 A1* | 4/2013 | Ruffolo | ............... | G06Q 10/06 705/7.18 |
| 2014/0240574 A1* | 8/2014 | Koda | ............... | H04N 5/23293 348/333.01 |
| 2015/0095077 A1* | 4/2015 | Ruffolo | ............... | G06Q 10/1053 705/7.13 |
| 2015/0120388 A1* | 4/2015 | Tan | ............... | H04W 4/21 705/7.32 |

FOREIGN PATENT DOCUMENTS

| | | |
|---|---|---|
| JP | H9-81863 A | 3/1997 |
| JP | H10-172068 A | 6/1998 |
| JP | H10-208148 A | 8/1998 |
| JP | 2001-126147 A | 5/2001 |
| JP | 2004-258965 A | 9/2004 |
| JP | 2005-128860 A | 5/2005 |
| JP | 2007-58660 A | 3/2007 |
| JP | 2014-41559 A | 3/2014 |
| WO | 02/25611 A1 | 3/2002 |

OTHER PUBLICATIONS

CPO; Application No. 201610842955.0; Chinese Office Action dated Jul. 24, 2018.

JPO; Application No. 2015-187598; Notification of Refusal dated May 22, 2018.

SIPO; Application No. 201610842955.0; Office Action dated Mar. 19, 2019.

* cited by examiner

FIG.2

| ID 141 | TITLE 142 | CONTENTS 143 | PERSON IN CHARGE 144 | NOTIFICATION START DATE 145 | FINISH DUE DATE 146 | CONFIRMATION DUE DATE 147 | NOTIFICATION DATE 148 | CONFIRMATION DATE 149 | FINISH DATE 150 | IMPORTANCE 151 | REGISTRATION PERSON 152 |
|---|---|---|---|---|---|---|---|---|---|---|---|
| 100000001 | ORDER OPERATION | AFTER CONFIRMING STOCK OF FOOD, ORDER TO O×TRADING | ICHIRO TOKYO | 2015/6/1 10:00:00 | 2015/6/14 10:00:00 | 2015/6/3 10:00:00 | 2015/6/15 10:00:00 | 2015/6/10 13:00:00 | | MOST IMPORTANT | ICHIRO KANAGAWA |
| 100000002 | STOCK CONFIRMATION | CONFIRM STOCK OF MERCHANDISE IN WAREHOUSE AND ON DISPLAY | JIRO TOKYO | 2015/6/1 10:00:00 | 2015/6/10 10:00:00 | 2015/6/3 10:00:00 | 2015/6/3 15:00:00 | 2015/6/3 16:00:00 | | IMPORTANT | ICHIRO KANAGAWA |
| 100000003 | SHIFT ADJUSTMENT | MAKE SHIFT FOR PARTY HELD ON 6/30, 30 PARTICIPANTS | ICHIRO TOKYO | | 2015/6/16 10:00:00 | 2015/6/14 10:00:00 | | | | NORMAL | |

⋯⋯

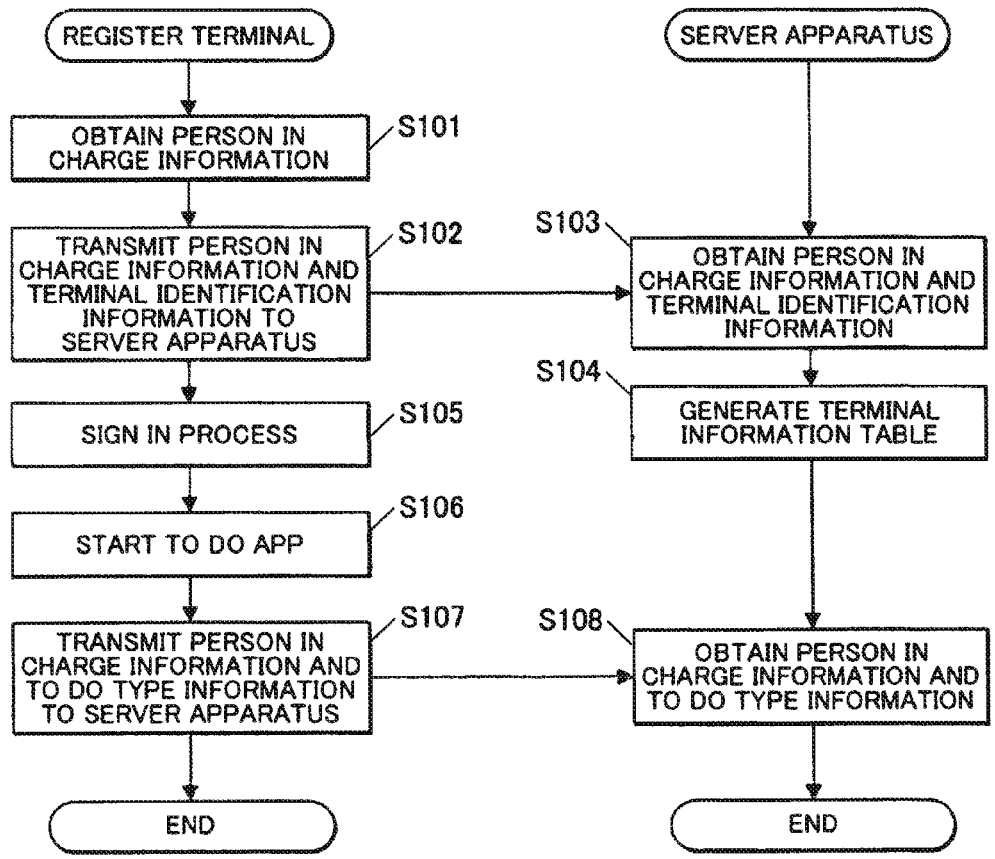

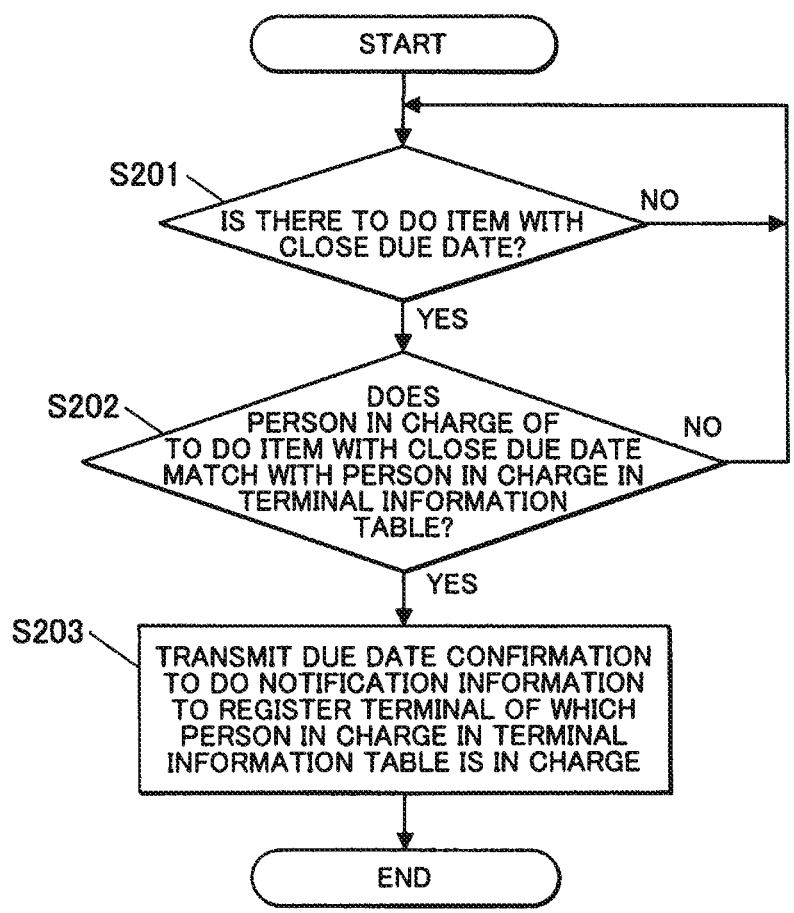

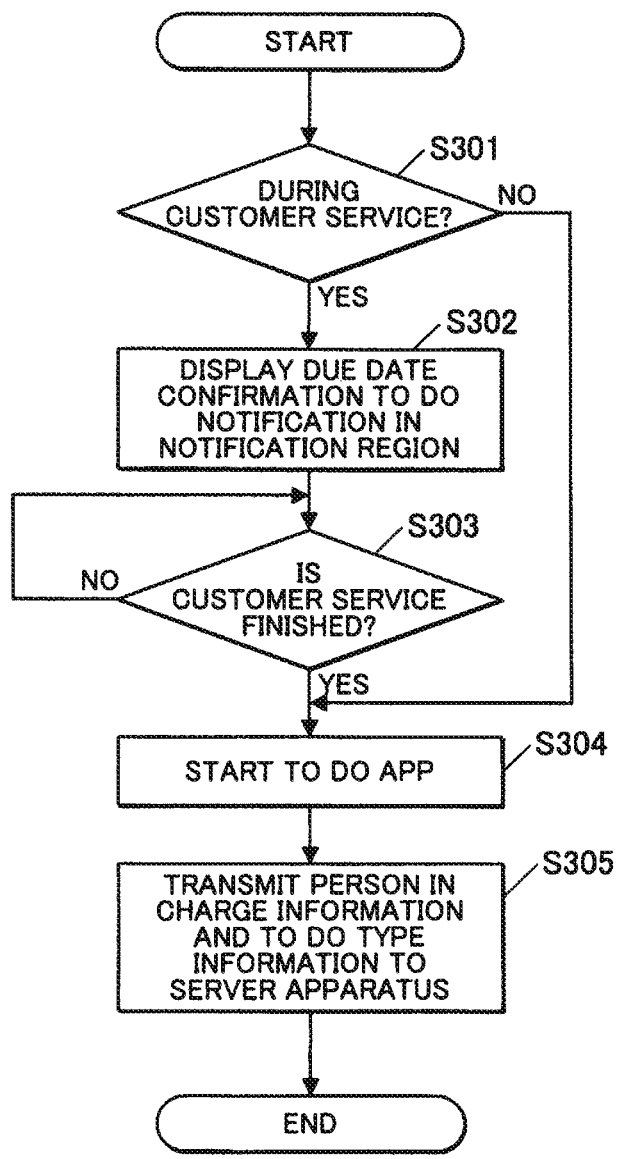

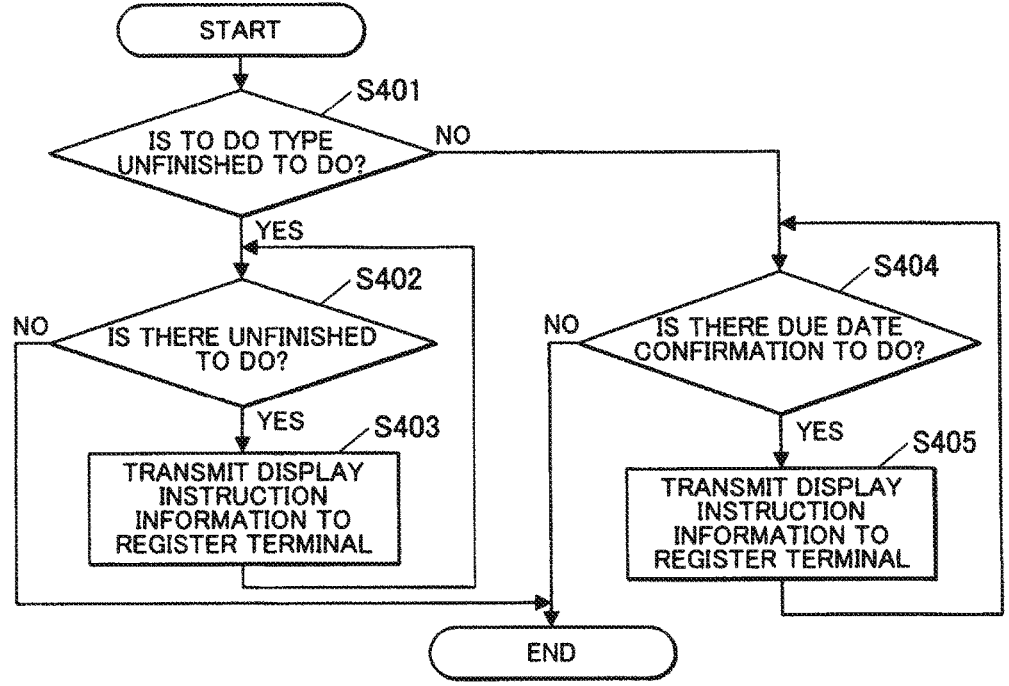

FIG.9

| TITLE | CONTENTS | CONFIRMATION DUE DATE | FINISH DUE DATE |
|---|---|---|---|
| ORDER OPERATION | AFTER CONFIRMING STOCK OF FOOD, ORDER TO O× TRADING | DONE | FINISH 2015/6/14 10:00 |
| SHIFT ADJUSTMENT | MAKE SHIFT FOR PARTY HELD ON 6/30, 30 PARTICIPANTS | CONFIRM 2015/06/14 23:00 | FINISH 2015/6/16 10:00 |
| XX OPERATION | XXXXX XXXXX XXXXX | CONFIRM 2015/06/18 23:00 | FINISH 2015/6/20 10:00 |
| △△OPERATION | △△△ △△△ △△△ | CONFIRM 2015/06/18 23:00 | FINISH 2015/6/20 10:00 |

TO DO LIST — DISPLAY 2015/6/13 10:00
TO DO ITEM NOT YET DONE BY ICHIRO TOKYO IS BELOW.

CLOSE (B13), B11, B12, F11, F12, F13, F14, G2

FIG.10

TO DO LIST — DISPLAY 2015/6/14 9:00
PLEASE PERFORM FOLLOWING TO DO ITEMS.
CLOSE DUE DATE OR ALREADY DUE.

| TITLE | CONTENTS | CONFIRMATION DUE DATE | FINISH DUE DATE |
|---|---|---|---|
| ORDER OPERATION | AFTER CONFIRMING STOCK OF FOOD, ORDER TO O× TRADING | DONE | FINISH 2015/6/14 10:00 |
| SHIFT ADJUSTMENT | MAKE SHIFT FOR PARTY HELD ON 6/30, 30 PARTICIPANTS | CONFIRM 2015/06/14 23:00 | FINISH 2015/6/16 10:00 |

CONFIRM LATER (B22), CLOSE (B23), B21, B24, F21, F22, F23, F24, G3

OPERATION MANAGEMENT APPARATUS, OPERATION MANAGEMENT METHOD, AND COMPUTER-READABLE STORAGE MEDIUM

CROSS-REFERENCE TO RELATED APPLICATION

This application is based upon and claims the benefit of priority from the prior Japanese Patent Application No. 2015-187598, filed on Sep. 25, 2015, the entire contents of which are incorporated herein by reference.

BACKGROUND OF THE INVENTION

1. Field of the Invention

The present invention relates to an operation management apparatus, an operation management method, and a computer-readable storage medium.

2. Description of the Related Art

Conventionally, in store operation, various techniques to provide information using a terminal in a store are well-known.

There is a technique disclosed to suitably combine fixed phrases based on customer data and purchase history data to make and print a message specialized for a certain customer (for example, Japanese Patent Application Laid-Open Publication No. 2001-126147).

There is a technique disclosed in which a message regarding sale items related to merchandise meeting a predetermined selection standard is printed on a receipt issued for each transaction (Japanese Patent Application Laid-Open Publication No. H09-81863).

A technique to manage operation instruction information (To Do information) including an operation instruction (To Do item) for each clerk involved in store operation is known. Basically, the To Do information can be displayed on a screen of a terminal such as a PC provided in a backyard of a store, and the clerks and manager can confirm the information.

SUMMARY OF THE INVENTION

However, since the clerks and manager are busy with their own operations during business hours of the store, it is difficult to always check the terminal screen provided in the backyard. Therefore, the contents of the To Do information confirmed before opening the store may be forgotten, and this may cause problems in store operation.

The present invention is made in view of the above problems, and the purpose of the present invention is to be able to directly communicate instructions regarding operations to each person in charge without interrupting the operations being performed by the person in charge.

According to an aspect of the present invention, there is provided an operation management apparatus including: a storage unit which stores operation instruction information showing contents of an operation instruction associated with a person in charge; a searching unit which, according to a request from a register terminal, searches the storage unit for operation instruction information corresponding to the person in charge who is assigned to the register terminal; and a transmitting unit which transmits the operation instruction information searched by the searching unit to the register terminal.

According to an aspect of the present invention, there is provided an operation management method including: storing in a storage unit operation instruction information showing contents of an operation instruction associated with a person in charge; searching, according to a request from a register terminal, the storage unit for operation instruction information corresponding to the person in charge who is assigned to the register terminal; and transmitting the operation instruction information searched in the searching to the register terminal.

According to an aspect of the present invention, there is provided a non-transitory computer-readable storage medium having a program stored thereon for controlling a computer to perform: searching, according to a request from a register terminal, a storage unit, which stores operation instruction information showing contents of an operation instruction associated with a person in charge, for operation instruction information corresponding to the person in charge who is assigned to the register terminal; and transmitting the operation instruction information searched in the searching to the register terminal.

According to the present invention, instructions regarding operations can be directly communicated to each person in charge without interrupting the operations being performed by the person in charge.

BRIEF DESCRIPTION OF THE DRAWINGS

FIG. 2 is a diagram showing an example of a To Do information table.

FIG. 3 is a diagram showing an example of a terminal information table.

FIG. 4 is a flowchart showing a process performed in a register terminal and server apparatus when a person in charge of the register terminal is specified.

FIG. 5 is a flowchart showing a process to search for a To Do item with a close confirmation due date or finish due date and to notify such To Do item to the person in charge.

FIG. 6 is a flowchart showing a process performed in the register terminal when due date confirmation To Do notification information is obtained.

FIG. 7 is a diagram showing an example of displaying a due date confirmation To Do notification in a notification region of a sales registration screen.

FIG. 8 is a flowchart showing a process to transmit information to display on the display of the register terminal the To Do item for the person in charge.

FIG. 9 is a diagram showing an example of an unfinished To Do display screen.

FIG. 10 is a diagram showing an example of a due date confirmation To Do display screen.

DETAILED DESCRIPTION OF THE PREFERRED EMBODIMENTS

A detailed embodiment of the present invention is described with reference to the drawings.

A configuration of an operation management system 100 of the present invention is described.

Figure 1:
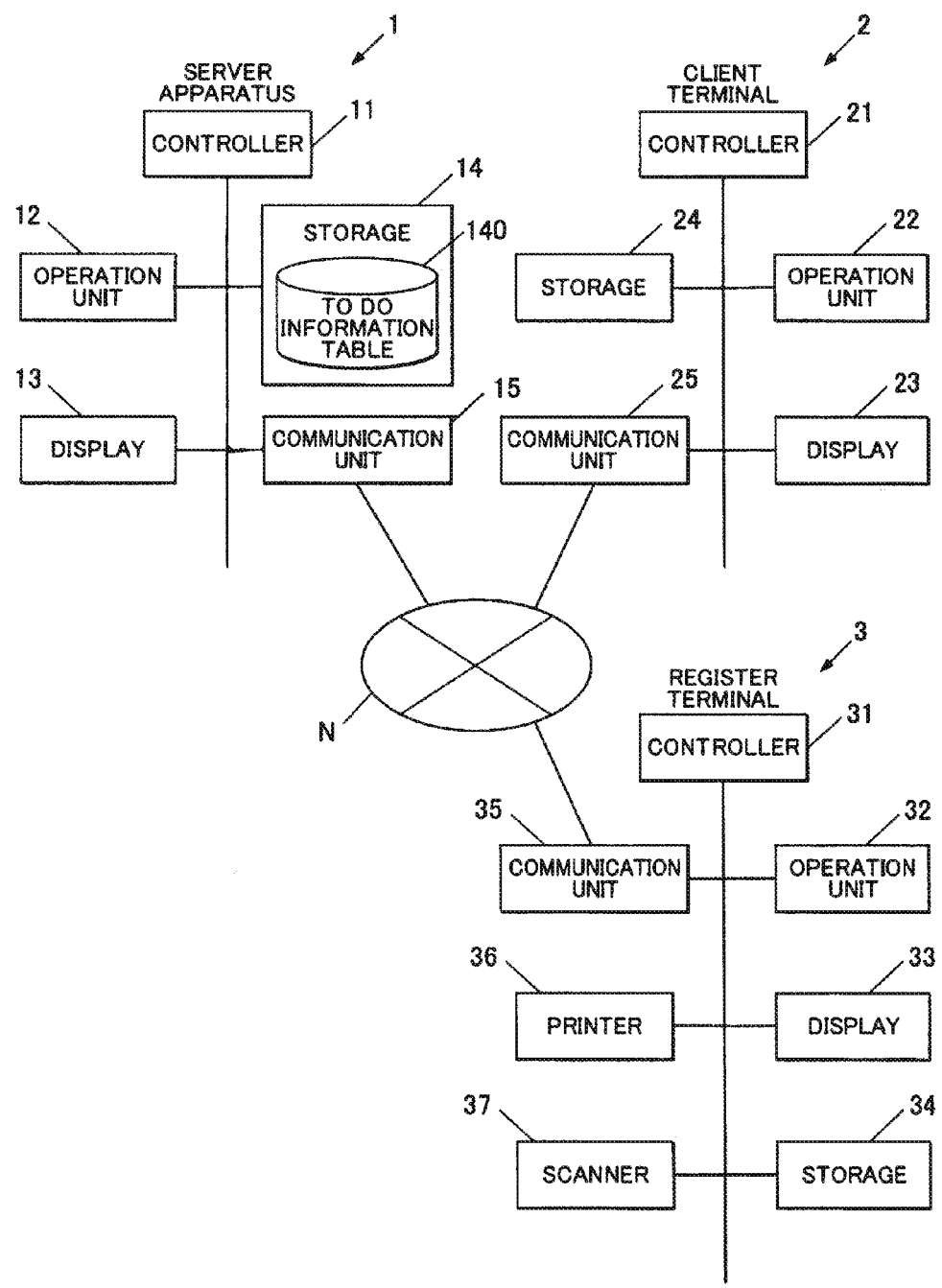
FIG. 1 is a block diagram showing a configuration of main control for each apparatus composing an operation management system according to the present embodiment.

As shown in FIG. 1, the operation management system 100 includes a server apparatus (operation management apparatus) 1, a client terminal 2, and a register terminal 3. In the operation management system 100, the server apparatus 1, the client terminal 2, and the register terminal 3 are connected to allow communication among one another through a communication network N. The communication network N is a communication network including wired LAN (Local Area Network), wireless LAN, mobile communication network, the Internet, and the like. The number of client terminals 2 is not limited.

The server apparatus 1 is an information device such as a PC, a WS (Work Station), etc. The server apparatus 1 is a schedule management server which manages an operation schedule, To Do items, and the like.

The server apparatus 1 is composed of one or a plurality of servers deployed on a communication network N. The present embodiment is composed of one management server, however, a group of a plurality of servers can be structured including a WEB server, a DB server, and a storage server.

As shown in FIG. 1, the server apparatus 1 includes a controller 11, an operation unit 12, a display 13, a storage 14, and a communication unit 15.

The controller 11 centrally controls operation of the server apparatus 1. Specifically, the controller 11 includes a CPU, a ROM, a RAM or the like. The CPU in coordination with the program data stored in the ROM or the storage 14 deployed in the work region of the RAM controls each unit of the server apparatus 1.

The operation unit 12 includes a keyboard including a character input key, a numeric input key, and other such keys corresponding to various functions, and a pointing device such as a mouse to receive input of operation from the user to output the operation signal corresponding to the input operation to the controller 11.

The display 13 includes a display such as a LCD (Liquid Crystal Display) and displays on a display screen an image based on a display control signal output from the controller 11.

The storage 14 includes a HDD (Hard Disk Drive), a semiconductor memory and the like, and stores data such as program data and various setting data received from the controller 11 as readable and writable data. The storage 14 stores a To Do information table 140 (operation instruction information) which is a table for managing the information regarding the content of the To Do items (operation instruction) and a terminal information table 160 which is a table for managing information regarding the register terminal 3 and the person in charge of the register terminal 3. In other words, the storage 14 functions as the storage unit of the present invention.

As shown in FIG. 2, the To Do information table 140 includes the following information, ID 141 which is a number to be able to discriminate and manage the To Do items (operation instruction), a title 142 which shows the name of the To Do item, contents 143 which shows the contents of the To Do item, person in charge 144 which shows who is to perform the To Do item, notification start date 145 which shows the date when notification of the To Do item starts, finish due date 146 which shows the due date of finishing the To Do item, confirmation due date 147 which shows the due date of confirming the To Do item, notification date 148 which shows the date when the To Do notification is performed, confirmation date 149 which shows the date that the To Do notification is confirmed, finish date 150 which shows the date the To Do item is finished, importance 151 which shows the degree of importance of the To Do item, and registration person 152 which shows who registered the To Do item.

According to the present embodiment, the importance 151 is input with 4 levels, "most important", "important", "normal", "not specified". The importance 151 does not have to be input with these 4 levels, and may be input with at least 2 levels. For example, the importance 151 can be input with 3 levels, "important", "normal", "not specified".

As shown in FIG. 3, the terminal information table 160 includes fields such as person in charge 161 which shows the person in charge of the register terminal 3, and terminal identification information 162 which is information to uniquely identify the register terminal 3.

The communication unit 15 is a communication interface including a communication IC (Integrated Circuit), a communication connector, etc., and the communication unit 15 communicates data through the communication network N using a predetermined communication protocol under control of the controller 11.

The client terminal 2 is an information device such as a PC, a tablet terminal, a smartphone, a cellular phone, or the like.

As shown in FIG. 1, the client terminal 2 includes a controller 21, an operation unit 22, a display 23, a storage unit 24, and a communication unit 25.

The controller 21 centrally controls the operation of the client terminal 2. Specifically, the controller 21 includes a CPU, a ROM, a RAM or the like, and the CPU in coordination with the program data stored in the ROM or the storage 24 deployed in the work region of the RAM controls each unit of the client terminal 2.

The operation unit 22 includes a keyboard including a character input key, a numeric input key, and other such keys corresponding to various functions, and a pointing device such as a mouse to receive input of operation from the user to output the operation signal corresponding to the input operation to the controller 21.

The display 23 includes a display such as a LCD and displays on a display screen an image based on a display control signal output from the controller 21.

The storage 24 includes a HDD, a semiconductor memory and the like, and stores data such as program data and various setting data from the controller 21 as readable and writable data.

The communication unit 25 is a communication interface including a communication IC, a communication connector, etc., and the communication unit 25 communicates data through the communication network N using a predetermined communication protocol under control of the controller 21.

The register terminal 3 is an ECR (electronic cash register) provided in a store such as a restaurant or a private store. The register terminal 3 receives identification information of the merchandise sold to the customer or information regarding the price and number of merchandise according to input operated by the clerk. In the register terminal 3, the sales data of the merchandise is calculated and registered, the payment from the customer is stored, and a receipt is printed. Examples of the register terminal 3 include, a cash register, an electronic register, a money register, a POS (Point of Sale) terminal, and the like. An application (herein after referred to as To Do App) to realize the function of displaying the To Do item of the person in charge of the register terminal 3 as a list on a display 33 is installed in the register terminal 3.

As shown in FIG. 1, the register terminal 3 includes a controller 31, an operation unit 32, the display 33, a storage 34, a communication unit 35, a printer 36, and a scanner 37.

The controller 31 centrally controls the operation of the register terminal 3. Specifically, the controller 31 includes a CPU, a ROM, a RAM or the like, and the CPU in coordination with the program data stored in the ROM or the storage 34 deployed in the work region of the RAM controls each unit of the register terminal 3.

The controller 31 performs the program of the To Do App stored in the storage 36, and starts the To Do App. In coordination with the server apparatus 1, the controller 31 realizes the function of displaying the To Do items of the person in charge of the register terminal 3 as a list on the display 33.

The operation unit 32 is a touch panel formed on the screen of the display 33 and outputs information according to input from the user touching the touch panel to the controller 31. The operation unit 32 can receive input by touching keys such as characters including text and numerals, and various other functions. The operation unit 32 may also include a plurality of keys to receive input of characters including text and numerals, and various other functions.

The display 33 includes a display such as a LCD and displays on a display screen an image based on a display control signal output from the controller 31.

The storage 34 includes a HDD, a semiconductor memory and the like, and stores data such as program data and various setting data from the controller 31 as readable and writable data. The storage 34 stores a program to perform the To Do App.

The communication unit 35 is a communication interface including a communication IC, a communication connector, etc., and the communication unit 35 communicates data through the communication network N using a predetermined communication protocol under control of the controller 31.

The printer 36 is a printer such as a thermal printer which prints information on a sheet. The printer 36 prints print information on a rolled sheet according to an instruction from the controller 31. The printer 36 includes a mechanism to cut the rolled sheet and output the sheet after printing.

The scanner 37 is a scanner of a one-dimensional barcode. The scanner 37 reads the barcode and outputs the binarized image data of the barcode to the controller 31. For example, the scanner 37 is a laser scanner, but the scanner can be an image scanner which images the barcode. The controller 31 decodes the image data output from the scanner 37, and obtains the code information included in the barcode.

The operation of the server apparatus 1 of the operation management system 100 of the present embodiment is described with reference to FIG. 4 to FIG. 11.

The process to register the To Do information and to generate the To Do information table 140 is described. The process starts when the controller 11 of the server apparatus 1 obtains from the client terminal 2 the To Do information registered by the user (employee or manager) in the client terminal 2.

The controller 11 of the server apparatus 1 generates the To Do information table 140 (see FIG. 2) based on the obtained To Do information. The To Do information transmitted from the client terminal 2 includes title 142, contents 143, person in charge 144, notification start date 145, finish due date 146, confirmation due date 147, importance 151, registration person 152, etc. and the To Do information table 140 is generated based on the above information. The generated To Do information table 140 is stored in the storage 14.

For example, FIG. 2 shows an example of generating the To Do information table 140 including a record associating ID 141 "10000001" with the To Do information including the following when the To Do information is transmitted from the client terminal 2, title 142 "order operation", contents 143 "after confirming stock of food, order to ox trading", person in charge 144 "Ichiro Tokyo", notification start date 145 "2015/6/1 10:00", finish due date 146 "2015/6/14, 10:00", confirmation due date 147 "2015/6/3, 10:00", importance 151 "most important", and registration person 152 "Ichiro Kanagawa".

When the To Do information table 140 is generated, the To Do item is not notified to the person in charge, and therefore, the fields of the notification date 148, confirmation date 149, and finish date 150 are blank.

The process performed in the register terminal 3 and the server apparatus 1 when the person in charge of the register terminal 3 is specified is described with reference to the flowchart shown in FIG. 4.

First, the controller 31 of the register terminal 3 obtains the person in charge information of the register terminal 3 (step S101). For example, when the person in charge of the register terminal 3 uses the scanner 37 to read the barcode which is provided to each person, the controller 31 obtains the read information as the person in charge information. For example, when the person in charge provides input to sign in to the apparatus on the sign in screen displayed on the display 33, the controller 31 obtains the information regarding the person in charge as the person in charge information.

Next, the controller 31 transmits the person in charge information obtained in step S101 and the terminal identification information to uniquely identify the terminal to the server apparatus 1 through the communication unit 35 (step S102).

The controller 11 of the server apparatus 1 obtains the person in charge information and the terminal identification information transmitted from the register terminal 3 (step S103).

The controller 11 generates the terminal information table 160 based on the person in charge information and the terminal identification information obtained in step S103 (step S104). The generated terminal information table 160 is stored in the storage 14.

For example, FIG. 3 shows an example of generating a terminal information table 160 including a record associating the person in charge information 161 "Ichiro Tokyo" and the terminal identification information 162 "XXXXXXXXXXXXXXXXXXXX1" when the above information is obtained in step S103.

The controller 31 of the register terminal 3 performs a process to specify the person in charge based on the person in charge information obtained in step S101 after the process of step S102 (sign in process) (step S105).

Next, the controller 31 executes the program of the To Do App stored in the storage 36 and starts the To Do App (step S106).

Next, the controller 31 transmits the person in charge information obtained in step S101 and To Do type information (type information) showing the type of the To Do item requested as the target of display on the To Do App to the server apparatus 1 through the communication unit 35 (step S107), and ends the process of the register terminal 3. Here, the To Do type information to request the unfinished To Do item as the target of display is transmitted. The unfinished To Do item is the To Do item which is not finished among the To Do items belonging to the person in charge.

The controller 11 of the server apparatus 1 obtains the person in charge information and the To Do type information transmitted from the register terminal 3 (step S108), and ends the process of the server apparatus 1.

Then, when the unfinished To Do item is transmitted from the server apparatus 1, the controller 31 of the register terminal 3 displays the unfinished To Do item on the display 33 (see FIG. 9).

When the unfinished To Do item is not transmitted from the server apparatus 1, the controller 31 ends the To Do App and displays the normal menu screen on the display 33.

According to the process described in FIG. 4, the To Do App is started and the unfinished To Do item is requested when the sign in process is performed. In addition to the above, the process to request the unfinished To Do item is performed when the person in charge manually starts the To Do App from the normal menu screen.

The process to search for the To Do item with the close confirmation due date or the close finish due date and to notify such items to the person in charge is described with reference to the flowchart shown in FIG. 5.

First, the controller 11 of the server apparatus 1 performs the process to search for the To Do item with a close due date each time a first predetermined length of time passes, and determines whether there is a To Do item with a close due date (step S201). Here, the first predetermined length of time is a predetermined value, for example, 5 minutes. The To Do item with the close due date is a To Do item with a confirmation due date or finish due date with the length of time left being equal to or within a second predetermined length of time. Here, the second predetermined length of time is a predetermined value, for example, 24 hours. Specifically, first, the controller 11 refers to the To Do information table 140 stored in the storage 14, and searches for the To Do item with the notification start date 145 past the "present date". Next, when there is a To Do item which satisfies either one of the following two conditions among the To Do items satisfying the above condition, the controller determines there is a To Do item with a close due date. The first condition is "the confirmation date 149 is "blank" and the length of time left until the confirmation due date 147 is equal to or within the second predetermined length of time". The second condition is "the finish date 150 is "blank", and the length of time left until the finish due date 146 is equal to or within the second predetermined length of time".

When it is determined that there is a To Do item with the close due date (step S201; YES), the controller 11 advances the process to the next step S202.

When it is determined that there is no To Do item with the close due date (step S201; NO), the controller 11 repeats the process of step S201 until it is determined that there is a To Do item with the close due date.

Next, the controller 11 refers to the To Do information table 140 and the terminal information table 160 stored in the storage 14 and determines whether the person in charge 144 of the To Do item with the close due date found in step S304 matches with the person in charge 161 in the terminal information table 160 (step S202). That is, the controller 11 determines whether the person in charge of the To Do item with the close due date is the person presently in charge of the register terminal 3.

When it is determined that the person in charge 144 of the To Do item with the close due date matches with the person in charge 161 of the terminal information table 160 (step S202; YES), the controller 11 determines the person in charge of the To Do item with the close due date is the person presently in charge of the register terminal 3. Then, the controller 11 advances the process to the next step S203.

When it is determined that the person in charge 144 of the To Do item with the close due date does not match with the person in charge 161 of the terminal information table 160 (step S202; NO), the controller 11 determines the person in charge of the To Do item with the close due date is not the person presently in charge of the register terminal 3. With this, the controller 11 advances the process to step S201, and repeats the process of searching for the To Do item with the close due date each time the first predetermined length of time passes.

Next, the controller 11 refers to the terminal information table 160 and transmits the due date confirmation To Do notification information (due date confirmation notification information) to notify that there is a due date confirmation To Do item to the register terminal 3 shown by the terminal identification information 162 associated with the person in charge 161 in the terminal information table 160 determined to match with the person in charge 144 of the To Do item with the close due date in step S202 through the communication unit 15 (step S203), and then ends the process. That is, the controller 11 functions as the transmission unit of the present invention. The due date confirmation To Do item is the To Do item with the confirmation due date or the finish due date with the length of time left being equal to or within the second predetermined length of time among the To Do items for the person in charge of the register terminal 3. That is, the due date confirmation To Do item is the To Do item among the To Do items with the close due date belonging to the person in charge 144 determined to match with the person in charge 161 in the terminal information table 160 in step S202. The due date confirmation To Do notification information includes the total number of due date confirmation To Do items, the ID 141 and the importance 151 of the To Do items showing the minimum value in the difference between the confirmation due date 147 and the present date or the difference between the finish due date 146 and the present date among the due date confirmation To Do items, and the minimum value.

The process performed in the register terminal 3 when the due date confirmation To Do notification information is obtained is described with reference to the flowchart in FIG. 6. The process starts when the controller 31 of the register terminal 3 obtains the due date confirmation To Do notification information transmitted from the server apparatus 1.

First, the controller 31 of the register terminal 3 determines whether the apparatus is serving the customer and is in a customer service state (step S301). Customer service is to serve the customer using the display 33 of the register terminal 3, for example, sales registration.

When it is determined to being in the customer service state (step S301; YES), the controller 31 advances the process to the next step S302.

When it is determined to not being in the customer service state (step S301; NO), the controller 31 advances the process to step S304.

Next, the controller 31 displays the due date confirmation To Do notification in the notification region E1 of the display 33 based on the due date confirmation To Do notification information transmitted from the server apparatus 1 (step S302). Here, the due date confirmation To Do notification is notification to show that there is a due date confirmation To Do item to the person in charge of the register terminal 3, and to urge the person in charge of the register terminal 3 to confirm the due date.

FIG. 7 shows an example of a sales registration screen G1 displaying a due date confirmation To Do notification in a notification region E1. As shown in FIG. 7, the notification region E1 is provided in the upper edge of the sales registration screen G1 so as not to interrupt the sales registration operation. Therefore, even if the due date confirmation To Do notification is displayed in the notification region E1, the sales registration operation of the person in charge is not interrupted. Specifically, the due date confirmation To Do notification includes time (=minimum value) until the due date of the To Do item in which the difference between the confirmation due date 147 and the present date or the finish due date 146 and the present date is minimum (that is, the To Do item with the shortest time left until the due date), the importance 151 of the To Do item, and the number of other due date confirmation To Do items. When the present date is already past the due date, the length of time until the due date is displayed with a minus. The importance 151 is displayed as follows, 3 stars for very important, 2 stars for important, and 1 star for normal.

For example, in the example shown in FIG. 7, the following is notified, the due date of the To Do item with the smallest length of time until the due date is "one hour later", the importance 151 of the To Do item is "3 stars (=very important)", and the number of other due date confirmation To Do items is "1 item".

According to the example shown in FIG. 7, the due date confirmation To Do notification is displayed in red. By displaying the due date confirmation To Do notification in red, the attention of the person in charge is drawn to the notification. For the purpose of ease of explanation, FIG. 7 shows the due date confirmation To Do notification in bold instead of in red.

Next, the controller 31 determines whether the customer service is finished (step S303).

When it is determined the customer service is finished (step S303; YES), the controller 31 advances the process to the next step S304.

When it is determined that the customer service is not finished (step S303; NO), the controller 31 repeats the process of step S303 until it is determined that the customer service is finished.

Then, the controller 31 executes the To Do App program stored in the storage 36 and starts the To Do App (step S304).

Next, the controller 31 transmits the person in charge information and the To Do type information to the server apparatus 1 through the communication unit 35 (step S305) and ends the process. Here, the To Do type information to request the due date confirmation To Do item as the target of display is transmitted.

The process of transmitting the information to display the To Do item for the person in charge on the display 33 of the register terminal 3 is described with reference to the flowchart in FIG. 8. The process is started when the person in charge information and the To Do type information transmitted from the register terminal 3 are obtained (see step S107 and step S108 in FIG. 4 and step S305 in FIG. 6).

First, the controller 11 of the server apparatus 1 refers to the To Do type information transmitted from the register terminal 3 and determines whether the type of the To Do item requested as the display target on the To Do App from the register terminal 3 is the unfinished To Do item (step S401).

When it is determined that the To Do type is the unfinished To Do item (step S401; YES), the controller 11 advances the process to the next step S402.

When it is determined that the To Do type is not the unfinished To Do item, that is, it is determined that the To Do type is the due date confirmation To Do item (step S401: NO), the controller 11 advances the process to step S404.

Next, the controller 11 performs the process to search for the unfinished To Do item, and determines whether there is an unfinished To Do item (step S402). That is, the controller 11 functions as a search unit of the present invention. Specifically, the controller 11 refers to the To Do information table 140 stored in the storage 14, and searches for the To Do item in which the person in charge 144 is "person in charge shown by the person in charge information transmitted from the register terminal 3", "present date" is past notification start date 145, and the finish date 151 is "blank". When there is a To Do item which satisfies the conditions, it is determined that there is an unfinished To Do item.

When it is determined that there is an unfinished To Do item (step S402; YES), the controller 11 advances the process to the next step S303.

When it is determined that there is no unfinished To Do item (step S402; NO), the controller 11 ends the process.

Next, the controller 11 transmits the display instruction information regarding the unfinished To Do item searched in step S402 to the register terminal 3 which transmitted the person in charge information and the To Do type information through the communication unit 15, and performs the process to display the unfinished To Do item on the display 33 of the register terminal 3 (step S403). That is, the controller 11 functions as the transmission unit of the present invention. Here, the display instruction information includes information in the To Do information table 140 (title 142, contents 143, confirmation due date 147, finish due date 146, etc.). When there is information input in the confirmation date 149 of the To Do information table 140, that is, when the To Do item is already confirmed by the person in charge, instead of the confirmation due date 147, information showing that the To Do item is confirmed is transmitted.

Then, the controller 11 advances the process to step S402 and performs the process to search for the unfinished To Do item again.

The controller 31 of the register terminal 3 displays on the display 33 the unfinished To Do display screen G2 based on the display instruction information transmitted from the server apparatus 1. As shown in FIG. 9, the unfinished To Do display screen G2 displays the unfinished To Do item searched in step S402 in a table format including the fields such as title F11, contents F12, confirmation (due date) F13, and finish (due date) F14.

Other than the confirmation due date 147, the field of the confirmation (due date) F13 displays a confirmation button B11 to notify to the server apparatus 1 that the person in charge confirmed the To Do item. When the person in charge presses the confirmation button B11, instead of the confirmation due date 147 and the confirmation button B11, "done" showing that the person in charge confirmed the To Do item is displayed in the field of the confirmation (due date) F13.

Other than the finish due date 146, the field of the finish (due date) F14 displays a finish button B12 to notify to the server apparatus 1 that the person in charge finished the To Do item. When the person in charge presses a finish button B12, instead of the finish due date 146 and the finish button B12, "done" showing that the person in charge finished the To Do item is displayed in the field of the finish (due date) F14. Here, when the finish button B12 is pressed before pressing the confirmation button B11, "done" is displayed in the field of the finish (due date) F14 simultaneously with "done" displayed in the field of the confirmation (due date) F13. Since the unfinished To Do items are displayed in the unfinished To Do display screen G2, the To Do item displayed with "done" in the field of finish (due date) F14 is not displayed from the next time and after.

That is, the confirmation button B11 and the finish button B12 are information for notification to notify to the server apparatus 1 that the To Do item is confirmed or the To Do item is finished.

A close button B13 is provided at the bottom right edge of the unfinished To Do display screen G2 to close the unfinished To Do display screen G2.

For example, the top record of the table shown in FIG. 9 displays the unfinished To Do item with the ID 141 "10000001". Specifically, the title 142 "order operation", the contents 143 "after confirming stock of food, order to ox trading", and finish due date 146 "2015/6/14, 10:00" (see FIG. 2) included under ID 141 "10000001" are displayed in each field of the title F11, contents F12, and finish (due date) F14. Other than the finish due date 146, the finish button B12 is displayed in the field of the finish (due date) F14. Since information including "2015/6/10 13:00" is input in the confirmation date 149 of the ID 141 "10000001", instead of the confirmation due date 147, information showing that the To Do item is confirmed is transmitted, and instead of the confirmation due date 147 and the confirmation button B11, "done" is displayed in the field of the confirmation (due date) F13.

When it is determined that it is the due date confirmation To Do item in step S401 (step S401: NO), the controller 11 performs the process to search for the due date confirmation To Do item and determines whether there is a due date confirmation To Do item (step S404). That is, the controller 11 functions as the search unit of the present invention. Specifically, first, the controller 11 refers to the To Do information table 140 stored in the storage 14 and searches for the To Do item in which the person in charge 144 is the "person in charge shown in the person in charge information transmitted from the register terminal 3", and the "present date" is after the notification start date 145. Next, the controller 11 determines that there is a due date confirmation To Do item when there is a To Do item which satisfies either one of the following 2 conditions among the To Do items which satisfy the condition described above. The first condition is "the confirmation date 149 is "blank", and the length of time left until the confirmation due date 147 is equal to or within a second predetermined length of time". The second condition is "the finish date 150 is "blank", and the length of time left until the finish due date 146 is equal to or within a second predetermined length of time".

When it is determined that there is a due date confirmation To Do item (step S404: YES), the controller 11 advances the process to the next step S405.

When it is determined that there is no due date confirmation To Do item (step S404: NO), the controller 11 ends the process.

Next, the controller 11 transmits the display instruction information regarding the due date confirmation To Do item searched in step S404 to the register terminal 3 which transmitted the person in charge information and the To Do type information through the communication unit 15, and performs the process to display the due date confirmation To Do item on the display 33 of the register terminal 3 (step S405). That is, the controller 11 functions as the transmitting unit of the present invention. Here, the display instruction information includes information of the To Do information table 140 (title 142, contents 143, confirmation due date 147, and finish due date 146). When information is input in the confirmation date 149 of the To Do information table 140, that is, when the person in charge already confirmed the To Do item, instead of the confirmation due date 147, information showing that the To Do item is already confirmed is transmitted.

Then, the controller 11 advances the process to step S404, and performs the process to search for the due date confirmation To Do item again.

The controller 31 of the register terminal 3 displays on the display 33 the due date confirmation To Do display screen G3 based on the display instruction information transmitted from the server apparatus 1. As shown in FIG. 10, the due date confirmation To Do display screen G3 displays the due date confirmation To Do item searched in step S404 as a table including the field of the title F21, contents F22, confirmation (due date) F23, and finish (due date) F24.

Other than the confirmation due date 147, a confirmation button B21 is displayed in the field of the confirmation (due date) F23. When the person in charge presses the confirmation button B21, "done" is displayed in the field of the confirmation (due date) F23.

Other than the finish due date 146, a finish button B22 is displayed in the field of the finish (due date) F24. When the person in charge presses the confirmation button B22, "done" is displayed in the field of the finish (due date) F24. Here, when the finish button B22 is pressed before pressing the confirmation button B21, "done" is displayed in the field of the confirmation (due date) F23 at the same time as displaying "done" in the field of the finish (due date) F24. Since the unfinished To Do item is displayed in the due date confirmation To Do display screen G3, the To Do item displaying "done" in the field of the finish (due date) F24 is not displayed next time and after.

When the due date confirmation To Do item is a To Do item with the length of time left until the confirmation due date 147 being equal to or within the second predetermined length of time, the confirmation due date 147 of the To Do item is displayed in red in the due date confirmation To Do display screen G3. Similarly, when the time limit confirmation To Do item is a To Do item with the length of time left until the finish due date 146 being equal to or within the second predetermined length of time, the finish due date 146 of the To Do item is displayed in red. For example, according to the example shown in FIG. 10, the finish due date 146 "2015/6/14 10:00" of the first To Do item (title 142 "order operation") is displayed in red. The confirmation due date 147 "2015/6/14 23:00" of the second To Do item ("shift adjustment" of the title 142) is displayed in red. As described above, by displaying the confirmation due date 147 and the finish due date 146 with the length of time left being equal to or within a second predetermined length of time in red, this draws the attention of the person in charge. For the purpose of ease of description, in FIG. 10, the confirmation due date 147 and the finish due date 146 with the length of time left being equal to or within a second predetermined length of time is described in bold instead of in red.

A close button B23 and confirm later button B24 are provided in the bottom right edge of the due date confirmation To Do display screen G3.

The close button B23 is a button to close the due date confirmation To Do display screen G3. If there is still a To Do item with a confirmation due date 147 with the length of time left being equal to or within the second predetermined length of time in which the confirmation button B21 is not pressed or a To Do item with a finish due date 146 with the length of time left being equal to or within the second predetermined length of time in which the finish button B22 is not pressed when the close button B23 is pressed, the due date confirmation To Do display screen G3 is displayed again after the end of processing checks or after the due date confirmation To Do notification is made again from the server apparatus 1 regarding the specific To Do item.

The confirm later button B24 is a button to temporarily close the due date confirmation To Do display screen G3. When the confirm later button B24 is pressed, the due date confirmation To Do display screen G3 is displayed again after a third predetermined length of time. Here, the third predetermined length of time is a predetermined value, for example 30 minutes. When the timing of displaying again is while serving the customer, the due date confirmation To Do notification is displayed in the notification region E1 of the display 33, and then the due date confirmation To Do display screen G3 is displayed again after finishing serving the customer.

Figure 11:
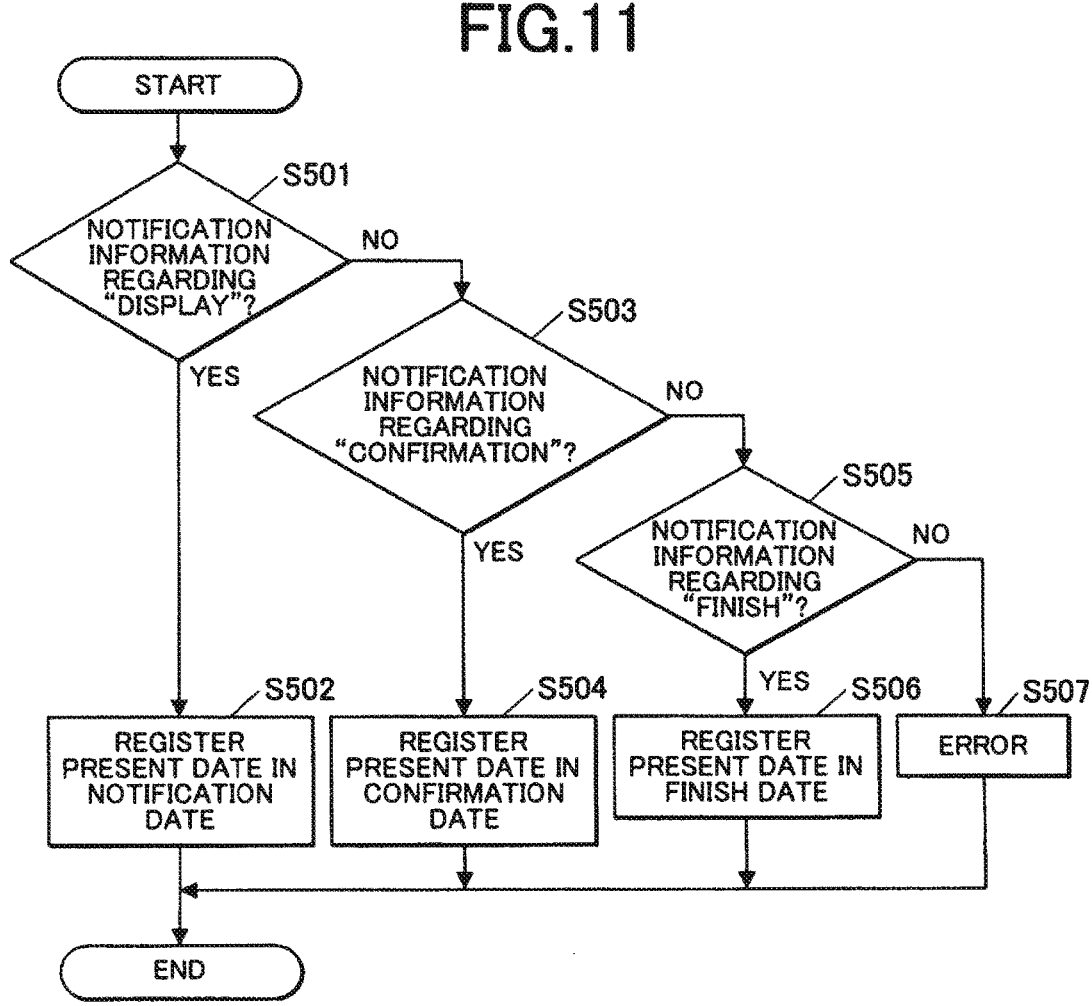
FIG. 11 is a flowchart showing a process to register the state of the To Do item.

The process to register (update) the status of the To Do item is described with reference to the flowchart shown in FIG. 11. The process starts when the controller 11 of the server apparatus 1 obtains the notification information transmitted from the register terminal 3.

Here, the notification information includes notification information regarding "display", notification information regarding "confirmation", and notification information regarding "finish". The notification information regarding "display" is the information to notify to the server apparatus 1 that the To Do item is displayed on the display 33. The notification information regarding "confirmation" is the information to notify to the server apparatus 1 that the To Do item is confirmed by the person in charge. The notification information regarding "finish" is the information to notify to the server apparatus 1 that the To Do item is finished by the person in charge.

When the To Do App is started and the unfinished To Do display screen G1 or the due date confirmation To Do display screen G2 is displayed, the controller 31 of the register terminal 3 transmits to the server apparatus 1 the ID 141 of all of the displayed To Do items including the notification information regarding "display".

When the confirmation button B11 displayed on the unfinished To Do display screen G1 or the confirmation button B21 displayed on the due date confirmation To Do display screen G2 is pressed, the controller 31 transmits the ID 141 of the To Do item for which the confirmation button B11 or the confirmation button B21 is pressed to the server apparatus 1 including the notification information regarding "confirmation".

When the finish button B12 displayed on the unfinished To Do display screen G1 or the finish button B22 displayed on the due date confirmation To Do display screen G2 is pressed, the controller 31 transmits the ID 141 of the To Do item for which the finish button B12 or the finish button B22 is pressed to the server apparatus 1 including the notification information regarding "finish".

The controller 11 of the server apparatus 1 functions as the receiving unit of the present invention by receiving the above notification information.

The process performed when the controller 11 of the server apparatus 1 obtains any of the notification information regarding "display", the notification information regarding "confirmation", and the notification information regarding "finish" is described.

First, the controller 11 of the server apparatus 1 refers to the notification information transmitted from the register terminal 3 and determines whether the notification contents is regarding "display" (step S501).

When it is determined that the notification contents is regarding "display" (step S501: YES), the controller 11 determines that the To Do notification is made to the person in charge and advances the process to the next step S502.

When it is determined that the notification contents is not regarding "display" (step S501: NO), the controller 11 advances the process to step S503.

Next, the controller 11 registers the present date in the notification date 148 of the ID 141 including the notification information transmitted from the register terminal 3 (step S502) and ends the process.

When it is determined that the notification contents is not regarding "display" in step S501, the controller 11 determines whether the notification contents is regarding "confirmation" (step S503).

When it is determined that the notification contents is regarding "confirmation" (step S503: YES), the controller 11 determines the person in charge confirmed the To Do item and the process advances to the next step S504.

When it is determined that the notification contents is not regarding "confirmation" (step S503: NO), the controller 11 advances the process to step S505.

Next, the controller 11 registers the present date in the confirmation date 149 of the ID 141 included in the notification information transmitted from the register terminal 3 (step S504), and ends the process.

When it is determined that the notification contents is not regarding "confirmation" in step S503, the controller 11 determines whether the notification contents is regarding "finish" (step S505).

When it is determined that the notification contents is regarding "finish" (step S505: YES), the controller 11 determines the person in charge finished the To Do item and advances the process to the next step S506.

When it is determined that the notification contents is not regarding "finish" (step S505: NO), the controller 11 determines there is an error in the notification information (step S507), and ends the process.

Next, the controller 11 registers the present date in the finish date 150 of the ID 141 included in the notification information transmitted from the register terminal 3 (step S507), and ends the process. When the present date is registered in the finish date 150 before the date is registered in the confirmation date 149, the present date is registered in the confirmation date 149 at the same time as the finish date 150.

According to the above process, the confirmation date 149 and the finish date 150 of the To Do items are registered, and therefore, the manager or employee who registers the To Do items can easily confirm whether the To Do item is confirmed or whether the To Do item is finished.

As described above, according to the server apparatus 1 of the operation management system 100 of the present embodiment, in reply to the request from the register terminal 3, the operation instruction information corresponding to the person in charge of the register terminal 3 is searched and the searched operation instruction information is transmitted to the register terminal 3. Specifically, based on the type information showing the type of operation instruction for the operation instruction which is requested as the display target from the register terminal, the operation instruction information displayed on the register terminal 3 is searched, and the searched operation instruction information is transmitted to the register terminal 3.

Therefore, the To Do item regarding the operation to be done that day can be displayed to the person in charge of the register terminal 3. With this, the To Do item can be directly notified to each person in charge. The suitable To Do item can be displayed according to the state of the operation of the register terminal 3. Therefore, the To Do item can be notified without interrupting the operation performed by the person in charge.

According to the present embodiment, the operation instruction information corresponding to the person in charge is searched when the sign in process to assign the person in charge to the register terminal 3 is performed.

Therefore, the To Do item regarding the operation for that day can be notified when the person in charge of the register terminal 3 starts operation of the register terminal 3. With this, the notification to the person in charge is not delayed, and it is possible to prevent delay of starting the To Do process.

According to the present embodiment, when the operation instruction information corresponding to the person in charge of the register terminal 3 is searched, and there is an operation instruction with a confirmation due date or a finish due date with the length of time left being equal to or within a predetermined amount of time, due date confirmation notification information showing that such operation instruction exists is transmitted to the register terminal 3.

Therefore, since it is possible to notify to the person in charge that there is a To Do item with a close due date and that the due date needs to be confirmed, it is possible to more reliably perform contents confirmation and finish confirmation of the To Do item by the person in charge.

According to the present embodiment, when the register terminal 3 is serving a customer, the notification to urge confirmation of the due date is displayed in a predetermined notification region of the display. When the register terminal 3 is performing operation other than serving the customer or after the service to the customer ends, the due date confirmation notification information to display on the display the operation instruction with a confirmation due date or a finish due date with the length of time left being equal to or within a predetermined length of time is transmitted to the register terminal 3.

Therefore, when the register terminal 3 is performing customer service, the To Do item with a close due date can be notified in a region that does not interrupt the operation. Consequently, the To Do item with a due date which needs to be confirmed can be notified without making the customer wait.

According to the present embodiment, information for notification to notify that the searched operation instruction information is confirmed or that the operation instruction shown by the operation instruction information is finished is transmitted to the register terminal 3. Moreover, the notification information transmitted from the register terminal 3 based on the selection of the information for notification is received.

Therefore, in addition to the To Do item, the information for notification to notify contents confirmation or finish confirmation of the To Do item can be displayed at the same time. Therefore, the contents confirmation and the finish confirmation of the To Do item can be easily done by simple operation such as selecting the information for notification.

The embodiments of the present invention are described in detail above, but the present invention is not limited to the above embodiments and suitable modification is possible.

For example, according to the present embodiment, the server apparatus 1 receives notification information regarding "confirmation" or "finish", but it is not limited to the above. For example, instead of the server apparatus 1 receiving the notification information, the portable terminal owned by the store manager or manager can receive the notification information.

In this case, the store manager or manager can receive the notification information when on holiday or outside. Therefore, the status of contents confirmation and finish confirmation of the To Do item by the person in charge can be obtained as necessary, and the store can be operated more stably.

According to the present embodiment, the To Do item displayed on the display 33 of the register terminal 3 is searched based on the To Do type information transmitted from the register terminal 3, but the present embodiment is not limited to the above. For example, the type of To Do item displayed on the display 33 can be set in advance and only the predetermined type of To Do items may be displayed regardless of the state of the register terminal 3 (that is, whether or not the apparatus is serving the customer). For example, only the unfinished To Do item may be displayed or only the due date confirmation To Do item may be displayed.

For example, when only the unfinished To Do item is displayed, the due date confirmation To Do notification information may not be transmitted to the register terminal 3. In this case, since the process to transmit the due date confirmation To Do notification information to the register terminal 3 does not have to be performed (see FIG. 5), the burden of operation in the server apparatus 1 can be reduced.

According to the present embodiment, when the register terminal 3 is serving the customer, the notification to urge confirmation of the due date is displayed in the predetermined notification region E1 of the display 33, but it is not limited to the above. Obviously, when the apparatus is serving the customer, it is preferable to display the notification to urge confirmation of the due date in the notification region E1 of the display 33. However, the notification can be displayed in the due date confirmation To Do display screen G3 even while serving the customer. In this case, the person in charge of the register terminal 3 may press the confirm later button B24.

According to the present embodiment, the notification urging the confirmation of the due date (due date confirmation To Do notification) is displayed in red in the predetermined notification region E1 of the display 33, but the style of display is not limited to the above. For example, the due date confirmation To Do notification can be displayed in a different display method according to degree of urgency. Here, degree of urgency is the index showing the degree of necessity of immediately notifying the due date confirmation To Do item to the person in charge of the register terminal 3. This is determined by items such as remaining amount of time or importance. The method of display according to degree of urgency may be, for example, changing the color of display from green to yellow to red as the remaining amount of time becomes smaller or the display may blink when the remaining amount of time becomes small. Alternatively, the color of display may change from green to yellow to red as the importance becomes higher, or the display may blink when the importance is highest (most important). That is, the method of display can be any method as long as the degree of emphasis becomes stronger as the urgency becomes higher.

According to the above configuration, the To Do item with a close due date can be notified with emphasis according to the degree of urgency. Therefore, it is possible to call the attention of the person in charge and more reliably notify the To Do item with the due date which needs to be confirmed.

According to the present embodiment, in the due date confirmation To Do display screen G3, the confirmation due date 147 and the finish due date 146 with the length of time left being equal to or within a second predetermined length of time are displayed in red, but it is not limited to the above. For example, in the unfinished To Do display screen G2 also, when there is a To Do item with the confirmation due date 147 or the finish due date 146 with the length of time left being equal to or within a second predetermined length of time, the confirmation due date 147 and the finish due date 146 with the length of time left being equal to or within a second predetermined length of time can be displayed in red.

According to the present embodiment, the confirmation due date 147 and the finish due date 146 with the length of time left being equal to or within a second predetermined length of time are displayed in red, but it is not limited to the above. Any display is possible so as to emphasize the confirmation due date 147 and the finish due date 146 with the length of time left being equal to or within a second predetermined length of time. For example, instead of display in red, display in bold is possible.

The specific configuration and operation of each unit composing the server apparatus, the client terminal, and the register terminal can be suitably changed without leaving the scope of the present invention.

Various embodiments of the present embodiment are described above, but the scope of the present invention is not limited to the above, and the present invention includes the scope as described in the claims and its equivalents.

What is claimed is:

1. A register terminal comprising:
a processor which performs a display control process to display on a display, operation instruction information showing contents of an operation instruction when an operation instruction close to a due date is found from a predetermined memory, the operation instruction close to the due date being an operation instruction with a length of time left until a confirmation due date or finish due date being equal to or within a predetermined length of time,
wherein according to the display control process, if the register terminal is performing a process regarding a customer service operation when the operation instruction information is to be displayed, notification information showing that there is the operation instruction close to the due date is displayed at an edge of an operation screen corresponding to the customer service operation and then, after the process or the customer service operation is finished, the operation instruction information is displayed.

2. The register terminal according to claim 1, wherein according to the display control process, the operation instruction information is displayed switched from the notification information and the operation screen.

3. The register terminal according to claim 1, wherein the processor further performs a communication control process which inquires to an external server the operation instruction corresponding to a user who signed in to the register terminal and receives the operation instruction corresponding to the user from the operation instruction stored in the memory.

4. The register terminal according to claim 1, wherein according to the display control process, the notification information is displayed aligned with present date/time information included in the operation screen.

5. The register terminal according to claim 1, wherein according to the display control process, the notification information is displayed in a different display manner depending on a remaining amount of time until the confirmation due date or the finish due date.

6. The register terminal according to claim 1, wherein the notification information includes due date information showing the confirmation due date or the finish due date and importance information showing importance of the operation instruction.

7. The register terminal according to claim 1, wherein according to the display control process, the notification information is displayed at an edge of a sales registration screen.

8. The register terminal according to claim 1, wherein according to the display control process, a number of operation instructions close to the due date is included in the notification information.

9. The register terminal according to claim 1, wherein according to the display control process, an input button to register that the operation instruction is confirmed or that the operation instruction is completed is displayed with the operation instruction information.

10. The register terminal according to claim 1, wherein according to the display control process, the operation instruction information is displayed switched from the operation screen and a pause button is also displayed to temporarily display the sales registration screen again switched from the operation instruction information.

11. An operation management method comprising:
displaying on a display operation instruction information showing contents of an operation instruction when an operation instruction close to a due date is found from a predetermined memory, the operation instruction close to the due date being an operation instruction with a length of time left until a confirmation due date or finish due date being equal to or within a predetermined length of time,
wherein in the displaying, if the register terminal is performing a process regarding a customer service operation when the operation instruction information is to be displayed, notification information showing that there is the operation instruction close to the due date is displayed at an edge of an operation screen corresponding to the customer service operation and then, after the process of the customer service operation is finished, the operation instruction information is displayed.

12. A non-transitory computer-readable storage medium having a program stored thereon for controlling a computer used in a register terminal, wherein the program controls the computer to perform the following process:
displaying on a display operation instruction information showing contents of an operation instruction when an operation instruction close to a due date is found from a predetermined memory, the operation instruction close to the due date being an operation instruction with a length of time left until a confirmation due date or finish due date being equal to or within a predetermined length of time,
wherein in the displaying, if the register terminal is performing a process regarding a customer service operation when the operation instruction information is to be displayed, notification information showing that there is the operation instruction close to the due date is displayed at an edge of an operation screen corresponding to the customer service operation and then, after the process of the customer service operation is finished, the operation instruction information is displayed.

\* \* \* \* \*